Patented Oct. 6, 1953

2,654,696

UNITED STATES PATENT OFFICE 2,654,696

TREATMENT OF LUBRICATING OIL

Walter N. La Porte, Swarthmore, Pa., assignor to Sun Oil Company, Philadelphia, Pa., a corporation of New Jersey No Drawing. Application June 2, 1950,
Serial No. 165,860

6 Claims. (Cl. 196—78)

This invention relates to a method of improving the visual properties of distillate lubricating oil without substantially altering any other important property of the oil.

The color and color stability of lubricating oil are important properties thereof, significantly affecting the value of the oil as a commercial product. It is desirable that lubricating oil have low color, i. e. that it be relatively light in color. It is also desirable that lubricating oil have good color stability, i. e., that its color increase relatively little upon standing or upon subjection to standard conditions tending to cause increase in color. Another important property of lubricating oil from the standpoint of its salability is that of "bloom," or appearance of the oil by reflected light. It is desirable that an oil have a greenish bloom and bright appearance in contrast to a bluish bloom which imparts a duller appearance to the oil and reduces its market value.

Previously, improvement in the above visual properties of lubricating oil has been effected by refining methods such as treatment with sulfuric acid and clay, but such treatment is quite expensive. The present invention relates to improvement of the visual properties of lubricating oil by an economical catalytic treatment thereof in the presence of hydrogen. More particularly, the present invention relates to a catalytic treatment with hydrogen wherein a high degree of improvement in the visual properties of an oil is obtained with no substantial cracking or hydrogenation of unsaturated linkages and with low consumption of hydrogen.

Prior art catalytic treatments of oil with hydrogen are characterized by relatively high hydrogen consumption, by substantial hydrogenation of unsaturated hydrocarbons and therefore by substantial change in the hydrocarbon nature of the oil.

In many cases, there would be an advantage in maintaining the hydrogen consumption in catalytic hydrogen treating at a low value in order to reduce costs, and in preventing substantial change in the hydrocarbon nature of the oil; the latter would have particular advantage when the use to which the oil is to be subsequently put makes it unnecessary or undesirable to change the hydrocarbon nature of the oil.

I have discovered that the hydrogen consumption in a process involving passing liquid oil downwardly through a catalyst bed under relatively mild hydrogen treating conditions can be minimized, without sacrificing anything in the way of color improvement, by using a hydrogen absolute pressure of about 10–35 atmospheres in the catalyst bed, an oil space rate of about 1–5 volumes of oil per volume of catalyst bed per hour, and an oil flow rate of about 10–160 cubic feet of oil per square foot of catalyst bed cross-section per hour.

Relatively mild hydrogen treating conditions, as contemplated here are conditions such that the hydrogen consumption is relatively low, i. e. not substantially more than five volumes of hydrogen (measured at 60° F. and one atmosphere) per volume of oil (measured at 60° F.) per hour. Such conditions generally include temperatures of about 450–575° F. in the catalyst bed. Whatever the temperature, the pressure in the catalyst bed is maintained in a value within the range 10–35 atmospheres and sufficient to prevent substantial vaporization of the oil.

A hydrogen treating catalyst is used in the process of the invention. The term, hydrogen treating catalyst, will be understood to indicate a catalyst capable of effecting, under conditions as herein specified, decolorizing reactions to the virtual exclusion of reactions of hydrogen with unsaturated linkages. Generally, the known mineral oil hydrogenation catalysts are suitable for this purpose, e. g. molybdenum, chromium, tungsten, vanadium, zinc, tin, nickel, copper, iron, cobalt, etc., or their oxides or sulfides or other compounds, either alone or in combination with each other or with other compounds such as alkali metal or alkaline earth metal oxides or sulfides. The catalyst may, if desired, be supported on a suitable catalyst carrier, e. g. alumina, silica, activated carbon, etc. Molybdenum and nickel catalyst, and particularly molybdenum sulfide, have been found especially suitable for use in the process of the invention.

It has been found that, in passing liquid oil downwardly through a catalyst bed under mild hydrogen treating conditions, the degree of color improvement obtainable is substantially independent of flow rate, whereas the amount of hydrogen consumed varies with the flow rate, and that generally the minimum hydrogen consumption obtainable for a given degree of color improvement can be obtained using relatively high flow rates of about 10–160.

Such relatively high flow rates are used, according to the present invention, only in combination with relatively mild hydrogen treating conditions including hydrogen pressures of about 10–35 atmospheres, and space rates of about 1–5. Under more severe hydrogen treating conditions, the effect of flow rate is relatively insignificant, the hydrogen consumption being relatively high regardless of flow rate.

The process of the present invention is applicable generally to distillate lubricating oil. Mineral oil residues, however, are generally too dark in color to be substantially improved by hydrogen treating under relatively mild conditions as contemplated in the present invention. The process of the present invention is particularly advantageous as applied to substantially wax-free lubricating oil from naphthenic base crude petroleum. The term, wax-free lubricating oil, where used in the present specification, will be understood to indicate a lubricating oil from which no substantial amount of solid material is precipitated by chilling to about 35° F. The term, naphthenic base crude petroleum, will be understood to indicate crude petroleum having viscosity-gravity constant of about 0.86 or higher. Lubricating oil distillates having S. U. viscosities at 210° F. of about 35–150 have been treated according to the present invention with particular effectiveness, but other lubricating oils in the distillate boiling range can also be treated according to the invention.

The process of the present invention is capable of effecting a high degree of color improvement in lubricating oil with little or no hydrogenation of sulfur compounds. Thus, the process can be applied in cases where the sulfur content of the charge oil is low, e. g. less than 0.5%, so that the sulfur compounds can be left in the oil without substantial detriment thereto, but where the charge oil needs substantial improvement in visual properties. The amount of hydrogen sulfide formed is, at the most, relatively quite small and may, if necessary, be removed from the product oil by steam stripping.

It is believed that in operation according to the invention, the oils being in the liquid state enables suppression of hydrogenation of unsaturated linkages by virtue of the fact that in flowing down through the catalyst bed, the oil forms a liquid film on the catalyst particles, which film has an appreciable thickness and therefore presents a liquid medium through which the hydrogen must diffuse in order to reach the catalyst surface, where hydrogenation of the oil largely takes place. The presence of the liquid film is believed to inhibit hydrogenation of unsaturated compounds, while still permitting the reactions which act to improve the visual properties of the oil. Furthermore, the greater the thickness of the film, it is believed, the more will be the inhibition of hydrogenation of unsaturated compounds.

According to the present invention, I exercise control over the thickness of the oil film on the catalyst particles as a means of further inhibiting hydrogenation of unsaturated hydrocarbons, while still permitting a high degree of color improvement. Hydrogen consumption is maintained at a low value by hydrogen treating under space rate and flow rate conditions which result in oil film thicknesses greater than those which have previously been used in hydrogen treating processes under the conditions specified.

Oil space rate is a measure of the rate of flow of oil through a unit volume of catalyst bed. It has been found that the degree of color improvement obtained in hydrogen treating at a given temperature and pressure by passage of oil through a bed of catalyst particles of given size and type depends directly on the space rate at which the oil is passed through the bed. When relatively high space rates are used, the thickness of the oil film on the catalyst particles is relatively great, and also the residence time of the oil in contact with the catalyst is relatively short, so that the degree of color improvement is relatively small.

Oil flow rate is a measure of the rate of oil flow past a unit of cross-sectional area of the catalyst bed. At a given space rate, the oil flow rate may be varied by changing the height of the catalyst bed, the following equation expressing the relationship involved: Flow rate equals the product of space rate and height in feet. It has been found that the degree of color improvement obtained in hydrogen treating at a given temperature and pressure by passage of oil at a given space rate through a bed of catalyst particles of given size and type does not vary substantially with the oil flow rate, at least not when the oil flow rate is within certain limits of values. It is believed that the reason for this fact is that, when relatively high flow rates are used at a given space rate, i. e. when relatively high catalyst beds are used at that space rate, the thickness of the oil film on the catalyst particles is relatively great, but also the residence time of the oil in contact with the catalyst is relatively great. Although I do not wish to be limited to any theory, it is believed that the residence time effect counterbalances the film thickness effect, so that degree of color improvement is not affected by increased flow rate.

Although degree of color improvement is dependent on space rate but not on flow rate, hydrogen consumption depends on both space rate and flow rate: that is, hydrogen consumption at a given space rate can be decreased by increasing the height of the catalyst chamber and thereby increasing the flow rate. As discussed above, such increase in flow rate can be effected without decreasing the degree of color improvement. Thus, the present invention contemplates the use of high flow rates in order to obtain thick oil films, and the use of such thick oil films in combination with relatively high space rate and relatively low hydrogen pressure 10–35 atmospheres, and other relatively mild reaction conditions in order to substantially eliminate hydrogenation of unsaturated hydrocarbons in the oil. Such hydrogenation requires more severe reaction conditions than are in effect when high film thicknesses are used according to the present invention; therefore, even when residence times are relatively long, such hydrogenation is inhibited by the thick oil film.

According to the present invention, even desulfurization reactions are minimized, and it is believed that the principal decolorizing reactions involved are reactions of hydrogen with organic nitrogen and oxygen compounds to yield hydrocarbons. At any rate, whether or not this theory is correct, the process of the present invention can be applied to low sulfur content oils, with resulting color improvement, though without any substantial desulfurization.

According to the present invention, space rates less than about 5 are used, because space rates higher than 5 result in a degree of color improvement which is too low to be economically attractive. Also, space rates of at least about one are used because space rates lower than one result in relatively high hydrogen consumption, indicating that undesired hydrogenation reactions are taking place, and also result in oil throughput values too low to be economically attractive.

In combination with the above space rate values as well as with the other contacting conditions above specified, flow rates of at least 10 cubic feet of oil per square foot of catalyst bed cross-section per hour are used in order to achieve a high degree of color improvement with low hydrogen consumption. Flow rates greater than 160 are not used, because they tend to result in too great a film thickness of oil on the catalyst particles.

It is to be understood that the degree of color improvement and hydrogen consumption at any given set of hydrogen treating conditions will vary with the nature of the oil charged to the process. Generally, more viscous oils require more severe conditions and more hydrogen consumption in order to give a certain degree of color improvement.

In exercising control over oil film thickness and hydrogen consumption as specified above, it is necessary to use catalyst having particle size substantially within the range 4–20 mesh, because the catalyst particle size affects the oil film thickness, and values of 4–20 mesh have been found suitable for obtaining, in conjunction with space rates and flow rates as above specified, the desired film thicknesses and hydrogen consumptions.

The following examples illustrate the invention:

The oil treated in each of the following examples was a lubricating distillate obtained from naphthenic base crude by a series of steps including preliminary distillation of the crude to remove lighter hydrocarbon fractions, such as gasoline, kerosene, and gas oil; neutralization of the distillation residue with caustic soda; and vacuum distillation of the neutralized residue to obtain a plurality of lubricating oil fractions having different boiling range and viscosity. The particular oil treated in Examples 1 and 2 had an S. U. viscosity at 210° F. of about 149, and an initial boiling point at 10 mm. Hg of about 520° F. This charge oil contained less than 0.5 weight percent sulfur.

In each example, the oil was preheated to a specified temperature and introduced onto the top of a stationary compact catalyst bed comprising 4 to 8 mesh particles of alumina impregnated with molybdenum sulfide, the particles being contained within a cylindrical catalyst chamber. Hydrogen under pressure was also introduced into the top of the catalyst bed. The oil flowed downwardly by gravity through the catalyst bed and was removed from the bottom thereof. The color of the oil was measured before and after passage through the catalyst bed. The product oil and hydrogen were collected in a receiver, at approximately atmospheric pressure, and in some runs the amount of hydrogen consumed was measured by venting product gases comprising mainly hydrogen from the receiver, and subtracting their volume, as determined by a gas meter, from the volume of hydrogen charged to the run. Corrections were made for the amount of hydrogen soluble in the oil at atmospheric pressure, so that the hydrogen consumption values finally obtained were a measure of the amount of hydrogen actually having reacted chemically with the oil.

The color of charge and product oil was in each case measured by means of a Beckman ultraviolet spectrophotometer. Light having 525 millimicrons wave length was passed through a one centimeter thickness of each oil sample in the spectrophotometer, and the optical density, as measured by the relative transmission, was recorded. The spectrophotometer operated at a slit width of 0.36 millimeter. The O. D. colors given in the following examples were obtained by multiplying by 100 the optical density values read from the spectrophotometer. Relatively high O. D. color values indicate relatively dark oils.

*Example I*

In this example, a series of runs was made at varying space rates. In each run the oil (initial color about 130 O. D.) was preheated to about 500° F., and the pressure in the catalyst bed was about 11 atmospheres. The catalyst bed was 10 feet high and one inch in diameter. The following table shows the effect of space rate on the color of the product oil.

| Space Rate | O. D. Color |
| --- | --- |
| 1 | 46 |
| 2 | 66 |
| 3 | 82 |
| 4 | 93 |
| 8 | 117 |

The above table shows that the degree of color improvement decreases with increasing space rate.

*Example II*

In this example, a series of runs was made at varying flow rates. In each run, the oil (initial color about 130 O. D.) was preheated to about 500° F. and flowed through the catalyst bed at a space rate of about 2. The catalyst bed was one inch in diameter. The pressure in the catalyst bed was about 11 atmospheres. The following table shows the effect of flow rate (in cubic feet of oil per square foot of catalyst bed cross-section per hour) on the color of the product oil, and on the hydrogen consumption. In these runs, the varying flow rates at constant space rate were obtained by varying the height of the catalyst bed.

| Height in Feet | Flow Rate | O. D. Color | Hydrogen Consumption |
| --- | --- | --- | --- |
| 2.5 | 5.0 | 59 | 1.4 |
| 4.2 | 8.3 | 61 | 1.1 |
| 6.7 | 13.3 | 57 | 0.9 |
| 10.0 | 20.0 | 66 | 0.5 |

The above table shows that degree of color improvement is substantially independent of flow rate, since the variations in product color with flow rate are substantially random, indicating no definite trend one way or the other. On the other hand, hydrogen consumption decreases with increasing flow rate, and can be minimized by using a relatively high flow rate.

In the above examples, the color stability of the product oil in each run was greater than the color stability of the charge oil; i. e. the product oil underwent less increase in color upon subjection to a temperature of 130° F. for 24 hours in the presence of an iron nail than did the charge oil upon subjection to the same conditions. Also, the bloom of the product oil was in each run substantially improved over that of the charge oil.

In each run in the above examples, there were no changes in properties of the oil indicative of a substantial change in the fundamental hydrocarbon character of the oil. The refractive index, for example, of the product oil was in no case changed from that of the charge oil by an increment greater than 0.001, and it is indicated therefore that no substantial hydrogenation of unsaturated compounds occurred.

In each run in the above examples, there was practically no change in the sulfur content of the product oil over that of the charge oil.

Catalysts comprising alumina impregnated with molybdenum sulfide have been found to have exceptionally long life when used according to the process of the invention. For example, 3200 volumes of oil have been passed through one volume of such catalyst without any measurable decrease in the activity of the catalyst.

It is to be understood that relatively light lubricating oil requires relatively less severe conditions in order to effect a given degree of color improvement, and that therefore the process of the invention, as applied to lubricating oils lighter than that treated in the above examples, involves generally higher flow rates than the maximum of 20 used in the above examples. Generally, lubricating oils having S. U. viscosities at 210° F. of about 35–75 are preferably treated according to the invention at flow rates of about 80–150, and lubricating oils having S. U. viscosities at 210° F. of about 75–150 are preferably treated according to the invention at flow rates of about 10–80.

I claim:

1. Process for improving the color of distillate lubricating oil without substantial hydrogenation of unsaturated hydrocarbons in said oil which comprises: passing said oil downwardly at a temperature within the approximate range from 450° F. to 575° F. through a bed of 4–20 mesh hydrogen-treating catalyst in the presence of hydrogen at a pressure within the range from 10 to 35 atmospheres and at a space rate within the range from 1 to 5 volumes of oil per volume of catalyst per hour and at a flow rate within the range from 10 to 160 cubic feet of oil per square foot of catalyst bed cross-section per hour, thereby to maintain a relatively thick liquid film of oil on the catalyst; and recovering from said bed a lubricating oil having refractive index within 0.001 of the refractive index of the charge oil, and having color substantially improved over that of the charge oil.

2. Process according to claim 1 wherein said pressure is about 11 atmospheres.

3. Process according to claim 1 wherein said hydrogenation catalyst comprises molybdenum sulfide.

4. Process according to claim 1 wherein said hydrogenation catalyst comprises nickel.

5. Process according to claim 1 wherein said hydrogenation catalyst comprises nickel sulfide.

6. Process according to claim 1 wherein the oil charged to said treatment contains less than about 0.5 weight percent sulfur.

WALTER N. LA PORTE.

References Cited in the file of this patent

UNITED STATES PATENTS

| Number | Name | Date |
| --- | --- | --- |
| 2,339,717 | Oberfell | Jan. 18, 1944 |
| 2,365,751 | Drennan | Dec. 26, 1944 |
| 2,526,966 | Oberfell et al. | Oct. 24, 1950 |
| 2,554,282 | Voorhies | May 22, 1951 |